M. J. KLEIN.
BALANCED SPEEDOMETER.
APPLICATION FILED MAR. 5, 1910.

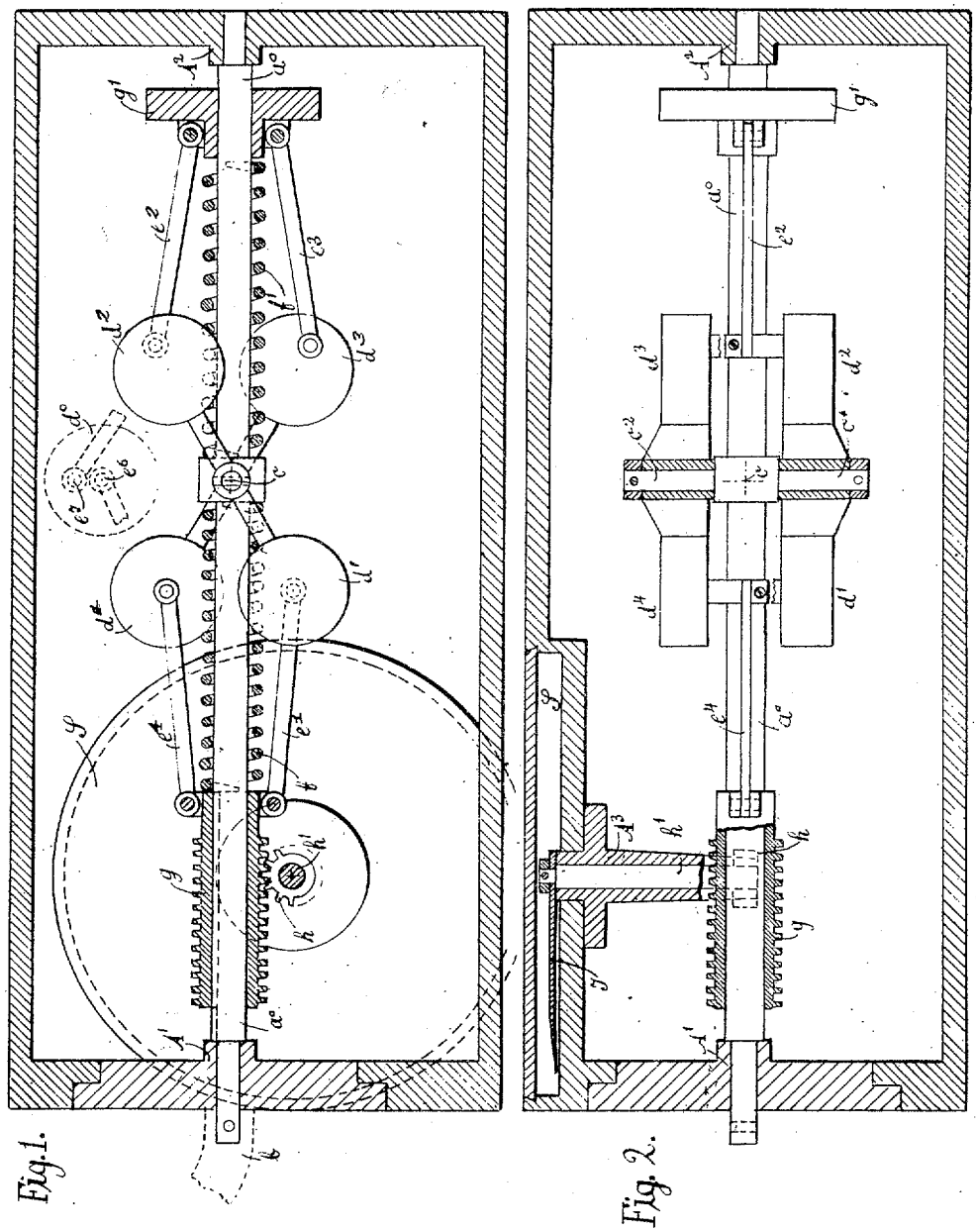

1,018,504.

Patented Feb. 27, 1912.

2 SHEETS—SHEET 2.

Witnesses
John Murtagh

Inventor
Mattias J. Klein
by Sauer & Gospel
Attorneys

UNITED STATES PATENT OFFICE.

MATHIAS J. KLEIN, OF NEW YORK, N. Y., ASSIGNOR OF SIXTY ONE-HUNDREDTHS TO HUGO B. ROELKER, OF NEW YORK, N. Y.

BALANCED SPEEDOMETER.

1,018,504.   Specification of Letters Patent.   Patented Feb. 27, 1912.

Application filed March 5, 1910. Serial No. 547,466.

*To all whom it may concern:*

Be it known that I, MATHIAS J. KLEIN, a citizen of the United States, residing in New York, borough of Manhattan, in the State of New York, have invented certain new and useful Improvements in Balanced Speedometers, of which the following is a specification.

This invention relates to speedometers of the centrifugal type for automobiles, motor cycles and other vehicles; its object being to indicate the correct vehicle speed not only on straight, level and smooth roads, but also on curves and banked and more or less rough roads; its object being further to increase the range of action of the speedometer, that is to show very small and very high vehicle speeds. I obtain these objects by a perfectly balanced speedometer of the centrifugal type, having two pairs of fly-balls, each pair connected by a straight bar pivoted alongside of the rotary shaft of the speedometer, and one main-spring or two main springs of different strength resisting the centrifugal force of said fly balls.

Figure 3:
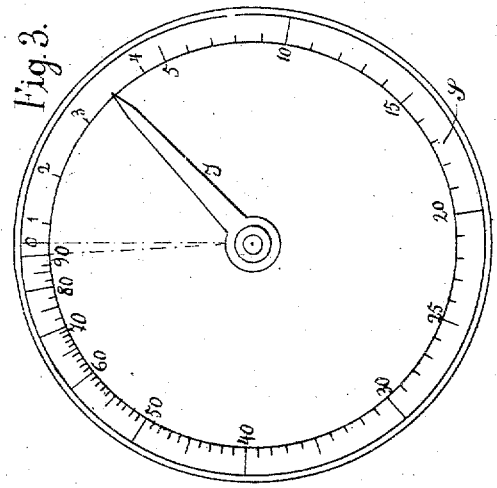
Figure 6:
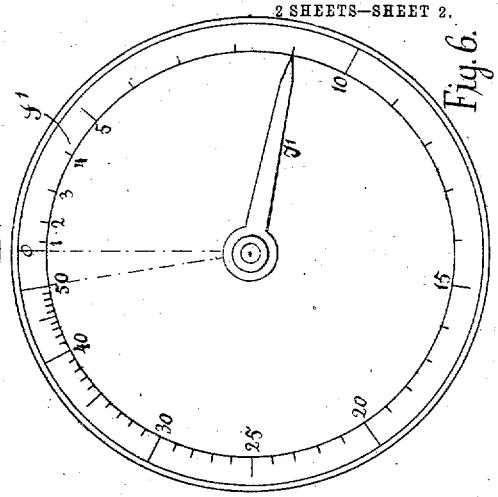
Figure 4:
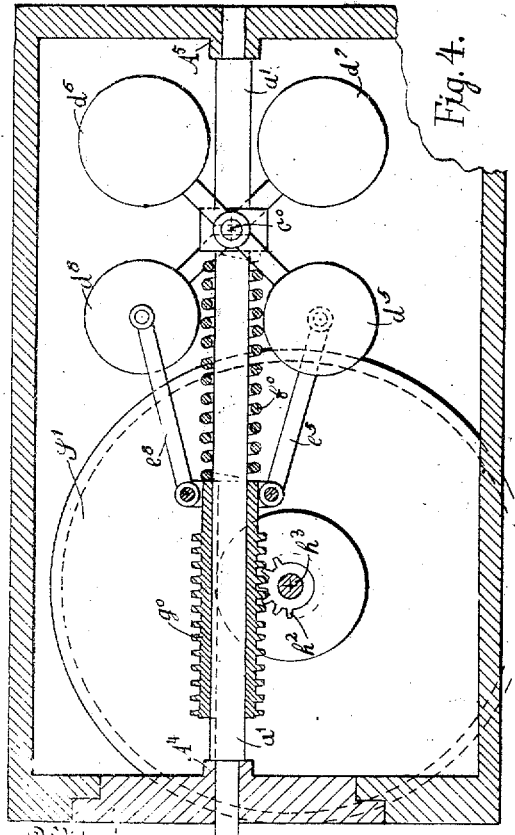
Figure 5:
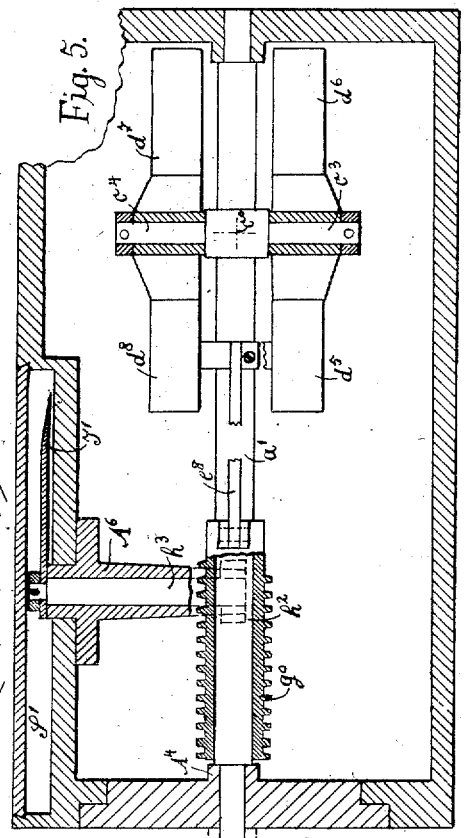

In the accompanying drawing Figures 1 and 2 are respectively a horizontal section and a vertical longitudinal section, parts being shown in elevation, of a balanced speedometer provided with my improvements. Fig. 3 shows the speed dial with indicator hand and scale. Figs. 4 and 5 are respectively a horizontal section and a vertical section of a modified construction of the "balanced speedometer" with one main spring only. Fig. 6 shows the dial of this modification.

Similar letters of reference indicate corresponding parts in all figures.

The revolving shaft $a°$, Figs. 1 and 2, of the balanced speedometer (the latter is usually on the dash board of the vehicle near the driver) receives its motion from one road wheel of the vehicle which is not a power wheel, by means of a pair of gear wheels (not shown) and a flexible shaft $b$. The shaft $a°$ of the speedometer rotates in the bearings $A^1$, $A^2$, and is provided at $c$ with a cross-shaft $c^1$, $c^2$, around which two pairs of fly-balls $d^1$, $d^2$ and $d^3$, $d^4$, each pair connected to a straight bar, oscillate in opposite directions and at equal angles. One pair of the fly-balls $d^1$, $d^2$ oscillates on one side of the rotary shaft $a°$, and the other pair $d^3$, $d^4$ on the other side of the same, thereby enabling said fly-balls to oscillate nearly 90° around said cross shaft without interfering one with the other or with the rotary shaft $a°$. The balls which are of equal weight are shown as made of cylindrical shape, but it is obvious that they may be of any other shape. On the shaft $a°$ are arranged two main springs $f$, $f^1$, of different strength, which tend to bring the fly-balls in proximity to the shaft $a°$ by means of the connecting bars $e^1$, $e^4$, $e^2$, $e^3$, as shown in Fig. 1. The sleeve $g$, which is splined to the shaft $a°$ and thereby prevented from turning on the same, is provided with an exterior ring-shaped rack, which meshes with a pinion $h$ on the shaft $h^1$, the latter turning in bearing $A^3$; the speed index-hand I, which is applied to the upper end of the shaft $h^1$ above the dial S Fig. 3, is thereby moved over the dial, its weight being balanced in regard to the shaft $h^1$. The helical spring $f$ is weaker than the spring $f^1$ and acts from zero on the dial. The spring $f^1$ is not called into action from zero up to a certain speed (say 4 miles per hour), and then for all higher speeds above this speed the spring $f^1$ acts in conjunction with the spring $f$. The centrifugal force of the fly-balls is therefore resisted from zero to say 4 miles by the spring $f$, and then for all speeds above 4 miles per hour by both springs $f$, $f^1$. For very high speeds, the fly-balls $d^2$ $d^4$ assume nearly the position $d°$ shown in Fig. 1, while the ends of their connecting bars $e^2$, $e^4$ move up to the position $e^7$, $e^6$; the fly-balls and the link-pins thereon are so arranged as not to interfere with each other even when revolving at very high speeds. The sleeve $g^1$ is likewise splined to the shaft $a°$ and of sufficient weight so that $g^1$ and $f^1$ balance $g$ and $f$ in regard to point $c$. The center of gravity of the fly-balls $d^1$, $d^4$ including members $e^1$, $e^4$, $f$, and $g$ remains always in the axis of the shaft $a°$ for all speeds, and such is the case with the center of gravity of members $d^2$, $d^3$, $e^2$, $e^3$, $f^1$, and $g^1$; the weights of the latter balancing the weights of the former at all speeds, perfectly (or nearly so), in regard to point $c$, and therefore different positions of shaft $a°$ and vehicle shocks and moving of the vehicle on curves and banked roads will not influence the indications of said speed meter. By the construction herein described, large fly-balls may be used and the speed meter be rendered very sensitive to small speed differences, its range of action being considerably increased by the use of the two main springs $f$, $f^1$.

The Figs. 4, 5 and 6 show a modification of the balanced speed meter with one main spring only. Revolving shaft $a^1$ (having the bearings $A^4$, $A^5$) is moved by flexible shaft $b^1$, which is connected on the other end to one vehicle wheel. The cross-shaft $c^3$, $c^4$ is connected at $c^0$ to revolving shaft $a^1$, the two pairs of fly-balls $d^5$, $d^6$, and $d^7$, $d^8$, oscillate around the cross-shaft $c^3$, $c^4$ in opposite directions and at equal angles sidewise of the rotary shaft $a^1$. The main spring $f^0$, which resists the centrifugal force of the fly-balls and moves the rack-shaped sleeve $g^0$, which by intermeshing with the pinion $h^2$ on shaft $h^3$ mounted in bearings $A^6$, operates the speed-indicator hand $I^1$ and moves the same over the dial $S^1$, Fig. 6. The two balls $d^6$, $d^7$ are larger than the balls $d^5$, $d^8$, so that they balance not only the weights $d^5$, $d^8$, in regard to point $c^0$ of shaft $a^1$, but also the helical spring $f^0$ and the sleeve $g^0$ and the pivot links $e^5$, $e^8$. This modification (shown in the Figs. 4, 5, 6,) with only one main spring of middle strength, shows that the scale divisions are large in the middle portion and very small for very low and very high vehicle speeds and it is difficult to read off these speeds. When a weak main spring is used alone, the fly-balls move up quickly and nearly reach their extreme positions at even moderate speeds; the scale divisions are large for low speeds, small for middle speeds, and very small for high speeds, it being nearly impossible to read the latter; if the one main spring is a strong one, it is nearly impossible to read the low speeds, but if a weak main spring is combined with a strong one, as in the arrangement shown in the Figs. 1, 2, 3, these scale divisions become more uniform and low and high speeds may be read with facility. In other words, the range of action of the speed meter is considerably increased. Figs. 3 and 6 illustrate this clearly.

The two pairs of fly-balls are arranged at opposite sides of and parallel with the center-plane of the rotary-shaft of the speedometer, as shown in Figs. 2 and 5, whereby the range of action of the speedometer is comparatively large, the oscillating angle of the fly-balls being from 85 to 90°, while when the fly-balls are in the same plane the angle of oscillation would be comparatively small, and would not be more than from 60 to 75°.

The modification of the balanced speed meter with one main spring (shown in Figs. 4, 5, 6,) may be used on vehicles of moderate speed (maximum about 50 miles per hour); if the maximum speed of the vehicle is over 50 miles per hour, the arrangement shown in Figs. 1, 2, 3, with two main springs is used.

Instead of the transmission of the movement from the fly-balls to the speed index-hand, as above shown, an equivalent arrangement may be used.

Having thus described my invention, I claim as new and desire to secure by Letters Patent:

1. In a balanced speedometer arrangement for vehicles, the combination of a rotary shaft receiving its motion from one of the road-wheels of the vehicle, a cross-shaft connected with said rotary shaft, two pairs of fly-balls oscillating in planes parallel with the vertical center-plane of the rotary shaft; straight bars connecting each pair of fly-balls, and being fulcrumed to said cross-shaft, one at one side and the other at the other side of the rotary shaft, a sleeve on said rotary shaft, a main-spring on said rotary shaft interposed between the cross-shaft and said sleeve and adapted to oppose the centrifugal force of the fly-balls, a dial, an index-hand movable over said dial, and means interposed between said sleeve and the index-hand for transmitting the oscillations of the fly-balls to the index-hand for indicating the speed of the vehicle on said dial.

2. In a balanced speedometer arrangement for vehicles, the combination of a rotary shaft, receiving its motion from one of the road-wheels of the vehicle, a cross-shaft connected with said rotary shaft, two pairs of fly-balls adapted to turn about said cross-shaft in opposite directions and at equal angles, straight bars connecting each pair of fly-balls, sleeves on said rotary shaft, links connecting said sleeves with the fly-balls, two main-springs on said rotary shaft resisting the centrifugal force of said fly-balls, one main-spring acting from zero up to a certain speed and the other main-spring acting with the first main-spring above said speed, the center of gravity of the fly-balls, sleeves, links and main-springs remaining at all vehicle-speeds practically in the intersecting point of the rotary and cross-shafts, a dial, an index-hand movable over said dial, and means for transmitting the oscillations of the fly-balls from one of the sleeves to the index-hand for indicating the speed of the vehicle on said dial.

In testimony, that I claim the foregoing as my invention, I have signed my name in presence of two subscribing witnesses.

MATHIAS J. KLEIN.

Witnesses:
PAUL GOEPEL,
FANNIE FISK.